United States Patent [19]

Czap

[11] Patent Number: 5,468,507
[45] Date of Patent: Nov. 21, 1995

[54] COMPOSITION CONTAINING A DESIRED FLAVORING AGENT AND MEDIUM CHAIN TRIGLYCERIDES

[76] Inventor: Al F. Czap, P.O. Box 3200, Sandpoint, Id. 83864-0360

[21] Appl. No.: 91,069

[22] Filed: Jul. 13, 1993

[51] Int. Cl.⁶ .................................................. A23D 9/00
[52] U.S. Cl. ......................... 426/99; 426/508; 426/609; 106/244
[58] Field of Search ................................. 426/804, 609, 426/99, 603, 508; 106/244

[56] References Cited

U.S. PATENT DOCUMENTS

| | | | |
|---|---|---|---|
| 4,247,471 | 1/1981 | Klein | 426/607 |
| 4,832,975 | 5/1989 | Yang | 426/804 |
| 4,960,602 | 10/1990 | Talkington et al. | |
| 5,000,975 | 3/1991 | Tomarelli | 426/607 |
| 5,066,510 | 11/1991 | Ehrman | 426/804 |
| 5,068,120 | 11/1991 | Yarger et al. | |
| 5,120,563 | 6/1992 | Mohlenkamp, Jr. et al. | |
| 5,166,189 | 11/1992 | Trimbo et al. | |
| 5,288,512 | 2/1994 | Seiden | 426/804 |

OTHER PUBLICATIONS

Brueckner et al. "Studies on the Chemical Properties of Medium Chain Triglycerides and Acetoglycerides" Zecz Probe Postepow Nauk Roln 211:91–98 1981.

*Primary Examiner*—Carolyn Paden
*Attorney, Agent, or Firm*—Seed and Berry

[57] ABSTRACT

A composition comprising a desired flavoring agent in combination with a high percentage of medium chain triglycerides suitable for use as a substitute for naturally occurring sources that can have desired flavors. The composition provides a desired flavor, while providing significantly more healthful nutritive value to a consumer. The composition preferably comprises a very high percentage of the medium chain triglycerides, and can further include one or more of a pigment, a consistency modifying material, an aroma-enhancing material, and one or more fat-soluble vitamins.

6 Claims, No Drawings

COMPOSITION CONTAINING A DESIRED FLAVORING AGENT AND MEDIUM CHAIN TRIGLYCERIDES

TECHNICAL FIELD

The field of the present invention is compositions that comprise medium chain triglycerides.

BACKGROUND OF THE INVENTION

Medium chain triglycerides ("MCTs") are generally considered to be a source of nutrition that is particularly healthy. In particular, MCTs are readily absorbed by the body. Such ready absorption can be particularly helpful where a consumer is suffering from a malabsorbtive disorder. Further, ketones that are produced during the metabolism of MCTs can be utilized by muscle tissue as an energy source.

MCTs are readily absorbed because the medium chain fatty acids comprising MCTs are easily hydrolyzed from the triglyceride. The hydrolyzed medium chain fatty, acids are then absorbed through the intestine, resulting in the direct transport of the medium chain fatty acids to the liver, via the hepatic portal vein. Upon reaching the liver, the medium chain fatty acids are extensively oxidized, providing a rapid energy source.

Further, MCTs provide a lessened potential for stored calories by a consumer relative to traditional chain length triglycerides, such as from corn oil.

SUMMARY OF THE INVENTION

The present invention is directed to a flavored composition comprising MCTs. Due to their biochemical nature and healthful nutritive value, MCTs combined with a desired flavoring agent provide a flavored composition that is a highly effective substitute for naturally occurring sources of the desired flavor. Accordingly, the present invention is directed to a composition comprising at least about 60% MCTs in combination with a desired flavoring agent. In preferred embodiments, the desired flavoring agent comprises one or more of garlic, roasted garlic, hazelnut, walnut, cashew, peanut, almond and olive. The composition of the present invention may also include one or more innocuous fillers, but preferably excludes triglycerides comprising short chain or long chain fatty acids, although minor amounts of such short chain or long chain fatty acids may be present in the composition without deviating from the scope of the present invention.

In preferred embodiments, the composition of the present invention comprises at least about 80% MCTs, typically at least about 90% MCTs, and preferably at least about 97% MCTs, and most preferably about 98% to about 99.5% MCTs by weight of the total composition.

In alternative embodiments, the composition of the present invention may further comprise a pigment, a consistency modifying material, an aroma-enhancing material, or one or more fat-soluble vitamins (i.e., vitamins A, D, E, and K).

In another preferred embodiment, the composition of the present invention consists essentially of MCTs and the desired flavoring agent. In such an embodiment, the composition does not contain significant amounts of a filler, or short chain or long chain fatty acids (either alone or as part of a triglyceride), but may include small amounts of a pigment, a consistency modifying material, an aroma-enhancing material, and one or more fat-soluble vitamins.

In a further aspect, the present invention provides a method of treating an edible substance comprising contacting the edible substance with a composition that comprises at least about 60% MCTs in combination with the desired flavoring agent. In preferred embodiments, the composition comprises higher percentages of MCTs, as discussed above, and may include one or more of a pigment, a consistency modifying material, an aroma-enhancing material, and one or more fat-soluble vitamins.

In still a further aspect, the present invention provides a method of inhibiting food from sticking to a cooking surface, comprising applying a coating to the cooking surface, the coating comprising a composition comprising a desired flavoring agent in combination with at least about 60% MCTs, and then contacting the food with the coated cooking surface. In preferred embodiments, the coating is applied by spraying the composition onto the cooking surface. In alternative embodiments, the composition is applied to the cooking surface by pouring or smearing the composition onto the cooking surface.

In another aspect, the present invention provides a composition comprising a desired flavoring agent in combination with MCTs, wherein the composition further comprises aerosol propellants that permit the composition to be emitted from an aerosol container as an aerosol spray.

In still another aspect, the present invention provides a composition comprising a desired flavoring agent and MCTs contained within a vessel able to emit the composition as a spray. In a preferred embodiment, the vessel is an aerosol container, and the composition further comprises aerosol propellants that permit the composition to be emitted from the aerosol container as an aerosol spray. In an alternative preferred embodiment, the vessel includes a mechanical pump that is capable of emitting the composition as a spray.

These and other aspects of the present invention will become evident upon reference to the following detailed description.

DETAILED DESCRIPTION OF THE INVENTION

The present invention provides a composition comprising a desired flavoring agent and MCTs that can be substituted for naturally occurring flavor sources, the inventive composition having a lower potential for stored calories and a lower content of cholesterol than naturally occurring flavor sources. The inventive composition also provides a more easily utilized source of energy than typical flavor sources.

The desired flavoring preferably comprises one or more of garlic, roasted garlic, hazelnut, cashew, peanut, almond and olive. These and other desired flavorings are well known to those having skill in the art, and are available from commercial sources such as IFF, 150 Dock Corner Road, Dayton, N.J. 08810.

An MCT comprises a triglyceride backbone having attached thereto three fatty acid chains that are generally from about $C_6$ to $C_{12}$ in length, although shorter or longer chains may be included within the term in differing contexts, as understood by those having skill in the art. The three medium chain fatty acids that are attached to the triglyceride backbone of the MCT may be, but need not be, identical. The medium chain fatty acids can be either saturated or unsaturated, but are preferably saturated. Examples of medium chain fatty acids that comprise the medium chain triglycerides of the invention include $C_6$ (caproic fatty acid), $C_8$ (caprylic fatty acid), $C_{10}$ (capric fatty acid), and $C_{12}$ (lauric fatty acid), as well as mixtures thereof. In preferred embodiments, the MCTs comprise a mixture of from about 60% $C_8$ and about 40% $C_{10}$ to a mixture of about 70% $C_8$ and about 30% $C_{10}$. Odd-numbered chains, such as $C_7$, $C_9$, and $C_{11}$ fatty acids, are not commonly found, but are included within the scope of the invention. Further, the MCTs of the present invention may include minor amounts of short or long chain fatty acids.

The composition of the present invention may be added to an edible substance, which means any substance that is edible, whether or not the edible substance has nutritive value. Accordingly, the term "edible substance" includes all foods and cosmetic materials such as toothpaste and mouthwashes, as well as pharmaceuticals and other substances.

Accordingly, in a first aspect the present invention provides a composition comprising at least about 60% MCTs in combination with a desired flavoring agent. The composition may also include one or more innocuous fillers, numerous examples of which are well known to those having skill in the art. In preferred embodiments, the composition comprises at least about 80% MCTs, further preferably at least about 90% MCTs, still further preferably at least about 97% MCTs, and most preferably about 98% MCTs to about 99.5% MCTs. The composition may also comprise one or more of a pigment so that the composition attains a pleasing coloring, a consistency modifying material so that the composition has a desired consistency, typically from gelatinous to watery, and an aroma-enhancing component, to produce a more pleasing aromatic quality for the composition. In another preferred embodiment, the composition of the present invention further comprises one or more fat-soluble vitamins, i.e., vitamins A, D, E and K. The ability to provide such vitamin supplements is a particular advantage of the present invention, in that typical flavorings are not able to provide effective transport for such fat-soluble vitamins.

In a further preferred embodiment, the present invention consists essentially of the desired flavoring and the MCTs. By "consists essentially of," it is meant that the composition comprises the desired flavoring and the MCTs, and may further comprise one or more materials that do not significantly affect the overall MCT content of the composition, such as one or more of flavorings, consistency modifying materials, aroma enhancers, and vitamins, but the composition excludes significant amounts of short chain or long chain fatty acids, short chain or long chain bearing triglycerides, and fillers.

In a further aspect, the present invention provides a method of treating an edible substance, comprising contacting the edible substance with a composition comprising a desired flavoring and MCTs. In preferred embodiments, the composition further comprises one or more of a pigment, a consistency modifying material, an aroma-enhancing material, and one or more fat-soluble vitamins, as described above.

In yet another aspect, the present invention provides a method of inhibiting food from sticking to a cooking surface, such as a frying pan or grill. The method comprises applying a coating comprising a composition comprising a desired flavoring agent in combination with MCTs to the cooking surface. Then, the food is contacted with the coated cooking surface. By applying a coating, it is meant that the inventive composition is sprayed, poured or smeared onto, or otherwise contacted with, the cooking surface, in a sufficient depth and over a sufficient area such that the food that is contacted with (and cooked on) the cooking surface sticks less to the cooking surface than it would if no anti-stick compound were utilized. In a preferred embodiment, the coating is applied at a uniform depth on an area of the cooking surface larger than the contact area of the food, thereby substantially preventing the food from sticking to the cooking surface at any point.

In a related aspect, the composition comprising the desired flavoring agent and MCTs further comprises aerosol propellants that permit the composition to be emitted from an aerosol container as an aerosol spray. Appropriate aerosol propellants are suitable for human consumption. Numerous such aerosol propellants, as well as aerosol containers for use with the aerosol propellant-containing composition, are well known to those having skill in the art.

In a further related aspect, the present invention provides the composition comprising a desired flavoring agent and MCTs contained within a vessel able to emit the composition as a spray. The vessel may also be capable of emitting the composition as a stream, or in other form, if desired. In a preferred embodiment the vessel is an aerosol container and the composition further comprises aerosol propellants, as discussed above. In an alternative preferred embodiment, the vessel includes a mechanical pump that is able to emit the composition as a spray. Such pumps may include either vertical, reciprocal pumps that are activated by the user pressing down and releasing a pump head, or a horizontally reciprocal trigger that causes the composition to be emitted by the pump upon squeezing by a user. These and other suitable mechanical pumps are well known to those of skill in the art.

The present embodiments of this invention are to be considered in all respects as illustrative and not restrictive, the scope of the invention being indicated by the appended claims rather than the foregoing description, and all changes that come within the meaning and range of equivalency of the claims are therefore intended to be embraced therein.

I claim:

1. A method of inhibiting food from sticking to a cooking surface, comprising:

(a) applying a coating comprising an edible composition comprising a desired flavoring agent in combination with at least about 60% medium chain triglycerides to the cooking surface to provide a coated cooking surface; then (b) contacting the food and the coated cooking surface.

2. The method of claim 1 wherein said coating is applied by spraying said composition onto said cooking surface.

3. The method of claim 1 wherein said coating is applied by pouring said composition onto said cooking surface.

4. The method of claim 1 wherein said coating is applied by smearing said composition onto said cooking surface.

5. A composition comprising a desired flavoring agent, at least about 60% medium chain triglycerides, and aerosol propellants that permit the composition to be emitted from an aerosol container as an aerosol spray.

6. A composition comprising a desired flavoring agent in combination with at least about 60% medium-chain triglycerides wherein the composition is contained within a vessel capable of emitting the composition as a spray, wherein said vessel is an aerosol container and said composition further comprises aerosol propellants that permit said composition to be emitted from said aerosol container as an aerosol spray.

* * * * *